United States Patent
Yano et al.

(10) Patent No.: US 6,507,378 B1
(45) Date of Patent: *Jan. 14, 2003

(54) REFLECTION TYPE LIQUID-CRYSTAL DISPLAY UNIT

(75) Inventors: Shuji Yano, Osaka (JP); Seiji Umemoto, Osaka (JP); Hitoshi Takahira, Osaka (JP)

(73) Assignee: Nitto Denki Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,308

(22) Filed: May 11, 1999

(30) Foreign Application Priority Data

May 11, 1998  (JP) ............................................. 10-146510

(51) Int. Cl.[7] .......................... G02F 1/1335; F21V 7/04
(52) U.S. Cl. ............................................ 349/63; 362/31
(58) Field of Search ............................... 349/63, 64, 65; 362/31, 330

(56) References Cited

U.S. PATENT DOCUMENTS 5,727,107 A * 3/1998 Umemoto et al. .......... 385/116
6,151,089 A * 11/2000 Yang et al. .................. 349/113
6,196,692 B1 * 3/2001 Umemoto et al. ............ 362/31

* cited by examiner

Primary Examiner—William L. Sikes
Assistant Examiner—Dung Nguyen
(74) Attorney, Agent, or Firm—Sughrue Mion, PLLC

(57) ABSTRACT

A reflection type liquid-crystal in which a light guide plate is in tight contact with a liquid-crystal display element having a reflecting layer through a bonding layer with refractive index in a range of from 1.40 to 1.55 and whole light transmittivity in a range of not less than 90%, the light guide plate being designed so that incident light from an incidence side surface is emitted from a lower surface through prismatic irregularities formed on an upper surface, and the light emitted from the lower surface takes maximum intensity at an angle of 30 degrees or less with respect to a normal to a plane of the lower surface, while maximum intensity of leakage light from the upper surface at that angle is not larger than ⅕ of the maximum intensity in the lower surface, and incident light from the lower surface is transmitted from the upper surface.

8 Claims, 4 Drawing Sheets

REFLECTION TYPE LIQUID-CRYSTAL DISPLAY UNIT

BACKGROUND OF THE INVENTION

1. Field of the Invention

The present invention relates to a reflection type liquid-crystal display unit which is superior in light availability, and in which the display image is bright and easy to view.

The present application is based on Japanese Patent Application No. Hei. 10-146510, which is incorporated herein by reference.

2. Description of the Related Art

It has been attempted to develop a front light system in which a light guide plate is disposed on a liquid-crystal display element on its viewing side, through an air layer, so that incident light from the side surface of the light guide plate is emitted from one of the upper and lower surfaces through a light emitting means. Various light guide plates suitable for such a front light system have been discussed.

However, there has been a problem that a large reflection loss is produced in the air layer interposed between the light guide plate and the liquid-crystal display element, resulting in lowering of brightness or blocking of visibility by the reflected light so that the visibility is lowered on a large scale.

SUMMARY OF THE INVENTION

It is an object of the present invention to obtain a light guide plate suitable for a front light system to thereby obtain a reflection type liquid-crystal display unit which is superior in light availability, and in which the display image is bright and easy to view.

According to an aspect of the present invention, provided is a reflection type liquid-crystal display unit wherein the liquid-crystal display unit comprises: a light guide plate having an upper surface, a lower surface and a light incident surface, the light guide plate being provided with a light emitting means constituted by prismatic irregularities formed on the upper surface, so that incident light from the incidence side surface is emitted from the lower surface through the light emitting means, and the light emitted from the lower surface takes maximum intensity in a direction at an angle of 30 degrees or less with respect to a normal to a reference plane of the lower surface, while maximum intensity of leakage light from the upper surface in the direction at an angle of 30 degrees or less is not larger than 1/5 of the maximum intensity in the lower surface, while incident light from the lower surface is transmitted from the upper surface; and a liquid-crystal display element provided with a reflection layer and disposed in tight contact on the lower surface of the light guide plate through a bonding layer, the bonding layer having refractive index in a range of from 1.40 to 1.55 and whole light transmittivity in a range of not less than 90%.

According to the present invention, it is possible to obtain a reflection type liquid-crystal display unit in which the out-going light from the lower surface of the light guide plate is superior in directivity in the vertical direction, wherein the leakage light from the upper surface hardly overlaps a display image. As a result, it is possible to obtain a reflection type liquid-crystal display unit which is superior in lighting availability, superior in contrast viewing at the time of not-lighting, at the time of lighting, and between the two, and superior in brightness for displaying, in which the display image through the light guide plate is hardly disordered and therefore superior in clearness.

Features and advantages of the invention will be evident from the following detailed description of the preferred embodiments described in conjunction with the attached drawings.

DETAILED DESCRIPTION OF THE PREFERRED EMBODIMENTS

In a reflection type liquid-crystal display unit according to the present invention, a liquid-crystal display element provided with a reflection layer is disposed tightly on the lower surface of a light guide plate through a bonding layer with refractive index in a range of from 1.40 to 1.55 and whole light transmittivity in a range of not smaller than 90%, the light guide plate being configured such that the incident light from the lower surface of the light guide plate is transmitted from the upper surface thereof. In the light guide plate used here, the incident light from the incident side surface of the light guide plate is emitted from the lower surface through a light emitting means constituted by prismatic irregularities formed on the upper surface, and the light emitted from the lower surface takes maximum intensity in the direction at an angle of 30 degrees or less with respect to a normal to the reference plane of the lower surface of the light guide plate, while the maximum intensity of the leakage light from the upper surface in the above-mentioned direction at an angle of 30 degrees or less is not larger than 1/5 of the above-mentioned maximum intensity of the light emitted from the lower surface.

Figure 1:
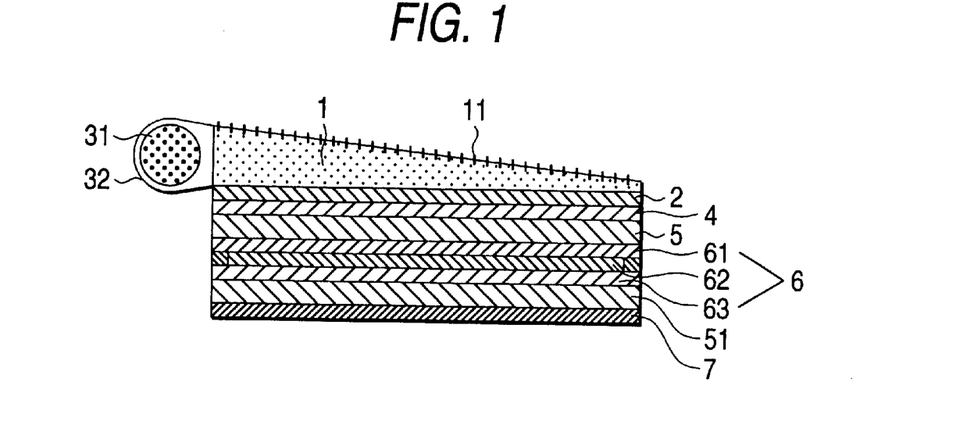
FIG. 1 shows a sectional side view of a reflection type liquid-crystal display unit.
Figure 2:
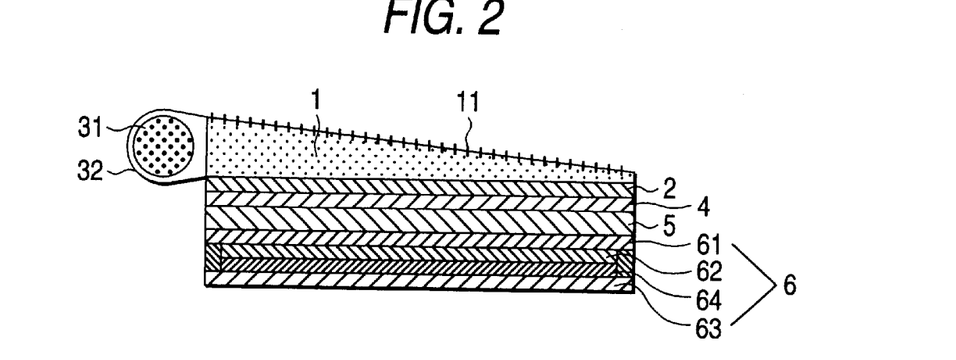
FIG. 2 shows a sectional side view of another reflection type liquid-crystal display unit.

An example of a reflection type liquid-crystal display unit according to the present invention is shown in FIGS. 1 and 2. The reference numeral 1 represents a light guide plate; 2, a bonding layer; and 6, a liquid-crystal display element. On the other hand, an example of the light guide plate is shown in FIG. 4 and FIGS. 5A to 5C. Each of the reference numerals 11, 16 and 17 represents an upper surface provided with a light emitting means constituted by prismatic irregularities; 13, an incident side surface; 14, a side surface; and 15, an opposite end to the incident side surface.

The light guide plate acts to emit light, which is incident from the incident side surface, out of the lower surface through the light emitting means which is formed on the upper surface and constituted by the prismatic irregularities. Generally, the light guide plate is constituted by a plate-like body having an upper surface, a lower surface opposite thereto, and an incident side surface formed by a side surface between the upper and lower surfaces. Although the plate-like body may be a plate with even thickness or the like, the thickness of the opposite end 15 opposite to the incident side surface 13 is preferably made smaller than that of the incident side surface, more preferably, the thickness of the former is made 50% or less of the latter, as seen in the drawings.

Figure 5A:
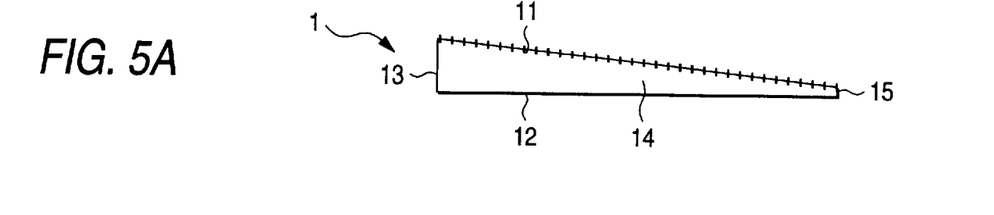
FIGS. 5A to 5C show side views explaining other light guide plates.
Figure 6A:
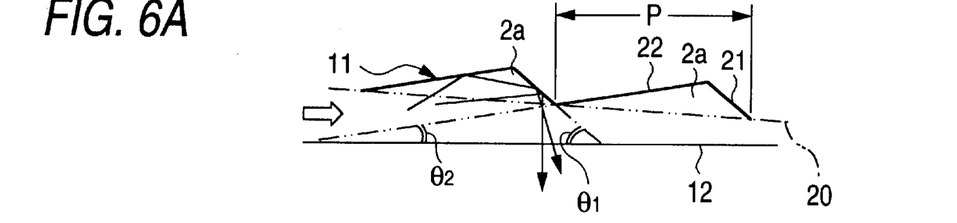
FIGS. 6A and 6B show side views explaining prismatic irregularities.
Figure 6B:
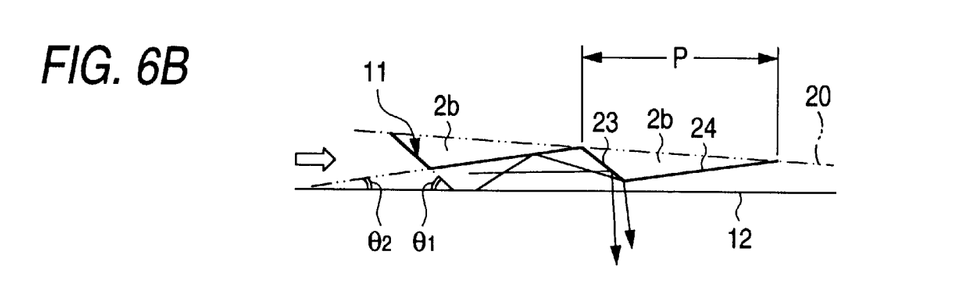
Figure 7:
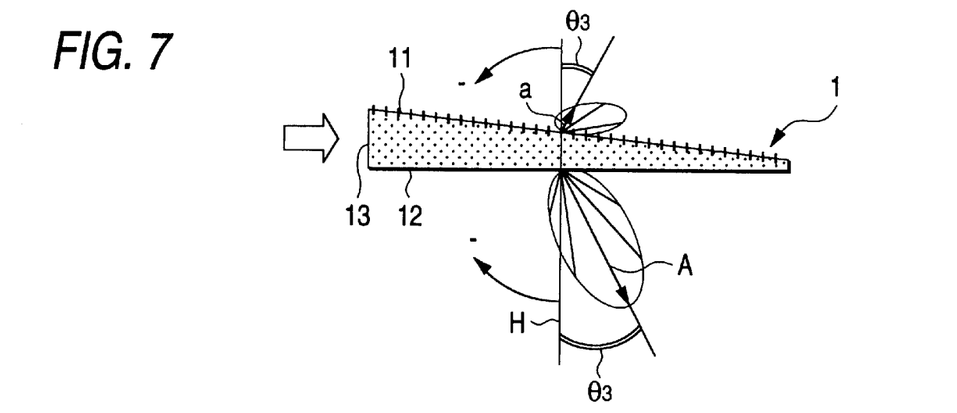
FIG. 7 shows an explanatory view of light emission characteristic of a light guide plate according to an embodiment.

When the thickness of the opposite end is reduced, there is such an advantage that the light incident from the incident side surface, as shown by a thick arrow in FIG. 6 or 7, can efficiently enter the light emitting means formed on the upper surface until the incident light reaches the opposite end while the incident light is emitted from the lower surface by reflection or the like, so that the incident light can be supplied to a target plane efficiently. In addition, there is another advantage that the light guide plate can be reduced in weight. For example, if the upper surface of the light guide plate is formed along a straight plane as shown in FIG. 5A, the weight of the light guide plate can be reduced to about 75% as much as that of light guide plate having even thickness.

Although the prismatic irregularities constituting the light emitting means may be formed by protrusion portions or recess portions consisting of equilateral sides, they are preferably formed by protrusion portions or recess portions consisting of short and long sides in view of utilization efficiency of light. Examples of such prismatic irregularities are shown in FIGS. 6A and 6B. The reference numeral 2a represents a protrusion portion; 2b, a recess portion; 21 and 23, short sides; and 22 and 24, long sides. Whether a portion is a protrusion portion or a recess portion is defined by the fact whether the intersection (apex) of the short and long sides projects outward or sinks inward from a straight line connecting the intersections of the short and long sides respectively.

That is, in the case based on the example shown in FIGS. 6A to 6B, whether a portion is a protrusion portion or a recess portion depends on the fact whether the intersection (apex) of the short and long sides (21 and 22 or 23 and 24) constituting the protrusion portion 2a or the recess portion 2b projects outward or sinks inward from an imaginary straight line 20 connecting the intersections of the short and long sides.

In the light guide plate according to the present invention, as shown in FIG. 7, the direction $\theta_3$ of maximum intensity A of the out-going light from the lower surface 12, which is derived from the incident light (represented by the thick arrow) through the incident side surface 13, exists at an angle of 30 degrees or less with respect to a normal H (front direction) to the reference plane of the lower surface, and the maximum intensity of leakage light from the upper surface in the above-mentioned direction at an angle of 30 degrees or less is 1/5 or less of the maximum intensity A of the light emitted from the lower surface.

The above-mentioned leakage light from the upper surface is apt to overlap reflection light which is the light showing the maximum intensity A and being reflected on a reflecting layer. If the maximum intensity ratio of the upper surface leakage light to the lower surface out-going light is large, the leakage light is apt to relatively cancel the intensity of a display image to reduce the contrast.

Figure 9:
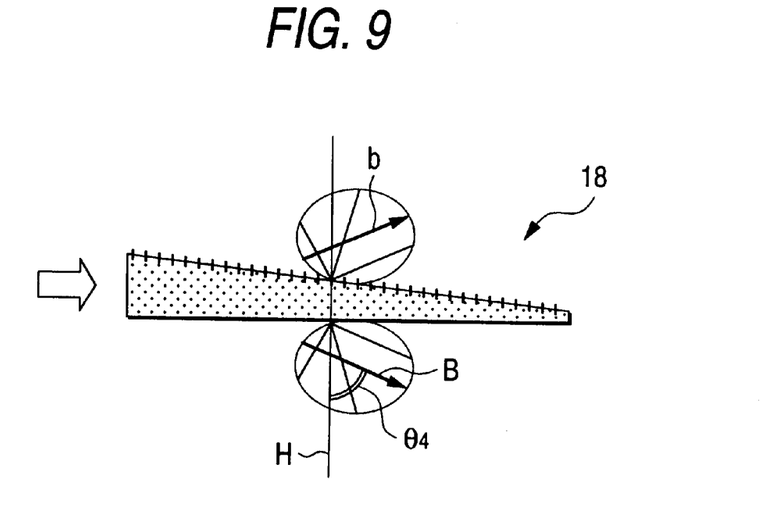
FIG. 9 shows an explanatory view of light emission characteristic according to the conventional art.
Figure 10:
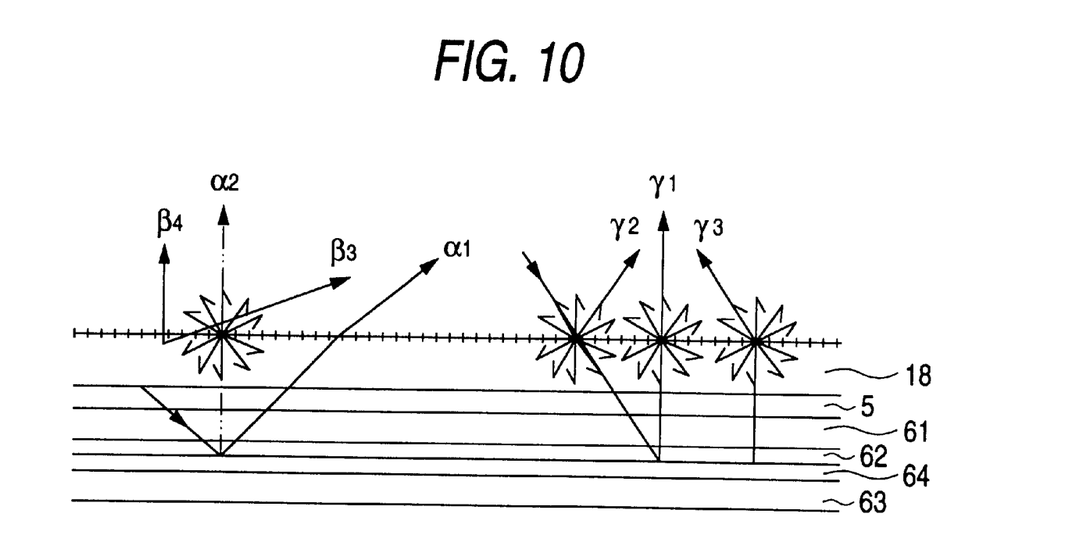
FIG. 10 shows an explanatory view of a display image according to the conventional art.

That is, as shown in FIGS. 9 and 10, in the conventional light guide plate having diffused dots or very small irregularities as light emitting means, the transmitted light incident from a side surface diverges substantially omnidirectionally by the scattering by the light emitting means of the light guide plate 18. By the scattering characteristic, not only the out-going light $\alpha_1$ from the lower surface but also the leakage light $\beta_3$ from the upper surface exhibit maximum intensity B and b in the direction $\theta_4$ at an angle of about 60 degrees with respect to the normal H to the lower surface, and both the intensities are substantially equal to each other. Accordingly, the quantity of light is reduced in a direction effective in visibility, particularly within a visual angle range extending vertically in a range of from an upper angle of about 15 degrees to a lower angle of about 30 degrees and extending horizontally in a range of from a left angle of about 30 degrees to a right angle of about 30 degrees with respect to the above-mentioned normal, so that display is poor in brightness. Not only the out-going light $\alpha_2$ from the lower surface forming a display image overlaps the leakage light $\beta_4$ from the upper surface so that display is poor in contrast, but also, when the light is tuned off, the display image becomes blurred in white because of the above-mentioned scattered light $\gamma_2$ so that display is poor in contrast. Accordingly, display light $\gamma_1$ and $\gamma_3$ are mixed by the scattering of light in the light guide plate so as to disturb the display image conspicuously.

On the other hand, a light guide plate having a prismatic light emitting means constituted by 45-degree inclined planes and horizontal planes according to Japanese Patent Publication No. Sho. 62-73206 causes the following problems of lowering the quality of display. That is, the amount of leakage light from the upper surface is large and this leakage light overlaps the out-going light from the lower surface forming a display image in the same manner as mentioned above to lower the contrast. In addition, the amount of the out-going light having a large out-going angle is large and the amount of light in a direction effective in visibility is small so that the brightness of the display is lowered.

Therefore, in order to form a bright and clear display image, as shown above in the present invention, the light guide plate is required so that the incident light from the side surface is emitted as the light A from the lower surface with high directivity and with high condensability at an angle $\theta_3$ as close as possible to the direction of the normal H to the lower surface as shown in FIG. 7, particularly within the above-mentioned visual angle range.

In addition, in a reflection type liquid-crystal display unit, usually, it is intended to display an image uniformly and clearly through a roughened-surface reflecting layer having an average scattering angle in a range of from about 5 to about 15 degrees. Accordingly, the following problems are apt to occur. That is, when the amount of light incident to the reflecting layer at a large angle is large as in the above-mentioned background-art light guide plate (FIG. 9: B, and FIG. 10: $\alpha_1$), the amount of light in a direction effective in visibility is reduced so that it becomes difficult to display an image brightly. In addition, the display is apt to be reversed in vision at a large angle so that color change increases in display of an electric field birefringence type.

Further, since the reflection type liquid-crystal display unit has a contrast ratio in a range of from 1:5 to 1:20 usually, the overlapping of leakage light and a display image gives a large influence on the contrast ratio. To improve the contrast, it is required to prevent the leakage light a from the upper surface from overlapping the out-going light A from the lower surface forming a display image as much as possible as shown in FIG. 7, and particularly it is required that the overlapping of light within the above-mentioned visual angle range is reduced as much as possible.

In the case of the above-mentioned reflection type liquid-crystal display unit, a light guide plate is preferred in view of improvement of display quality such as brightness, contrast and so on, if it is designed so that the direction $\theta_3$ of the above-mentioned maximum intensity A is 28 degrees or less, preferably 25 degrees or less, more preferably 20 degrees or less with respect to a vertical plane (illustrated section) to the both reference planes of the incident side surface 13 and the lower surface 12 as shown in FIG. 7.

In addition, when the incident side surface 13 side is regarded as a negative direction with respect to the above-mentioned normal H, a light guide plate is required so that the intensity of the leakage light a from the upper surface 11 at the same angle $\theta_3$ as the direction of the maximum intensity A takes a value which is as small as possible so as to be not larger than 1/10 of the maximum intensity A, preferably not larger than 1/15, more preferably not larger than 1/20. Since the leakage light a overlaps the positive reflection direction of the light exhibiting the maximum intensity A, the leakage light a cancels the intensity of a display image relatively so as to lower the contrast as mentioned above if the ratio a/A is large.

In view of achieving the above-mentioned characteristics such as the maximum intensity direction, the maximum intensity to leakage light intensity ratio, and so on, a preferred light emitting means has a structure of repetition of prismatic irregularities (2a or 2b) constituted by short sides ($\theta_1$) inclined at an angle in a range of from 30 to 45 degrees with respect to the reference plane of the lower surface 12 and long sides ($\theta_2$) inclined at an angle in a range of from over 0 to 10 degrees as shown in FIG. 6.

In such a structure, short sides 21 and 23 formed as slopes inclined from an incident side surface (13) side toward an opposite end (15) play a role to reflect light which is a part of incident light from the side surface and which is incident to the short sides so that the reflected light is supplied to the lower surface (light emitting surface). In that case, when the inclination angle Θ1 of the short side is set to be in a range of from 30 to 45 degrees, the transmitted light can be reflected perpendicularly to the lower surface as shown by the polygon arrow in FIG. 6, so that it is possible to efficiently obtain lower surface out-going light exhibiting a direction Θ3 of the maximum intensity A within an angle of 30 degrees with respect to the normal H of the lower surface as shown in FIG. 7.

In view of the above-mentioned performance such as restraint of leakage light, restraint of disturbance of visibility, or the like, the inclination angle $\theta_1$ of the short side is set to be in a range of from 32 to 43 degrees, preferably from 35 to 42 degrees. If the inclination angle $\theta_1$ of the short sides is smaller than 30, the direction of the maximum intensity of the lower surface out-going emitted light will take a large angle with respect to the normal, so that the amount of light effectively available for visibility is reduced and the brightness of light is apt to be poor. If the inclination angle $\theta_1$ exceeds 45 degrees, the amount of leakage light from the upper surface will be apt to increase.

On the other hand, the long sides are not only to reflect the transmitted light incident thereto so as to supply the reflected light to the short sides, but also to transmit a display image from a liquid-crystal display element in the case of a reflection type liquid-crystal display unit. Thus, the inclination angle $\theta_2$ of the long sides with respect to the reference plane (12) of the lower surface is preferably set to be in a range of from over 0 to 10 degrees.

As a result, transmitted light at an angle larger than the inclination angle $\theta_2$ is incident to the long sides 22 and 24 and reflected thereon as shown by the polygon arrow in FIG. 6. In that case, the light reflected at an angle so as to be in parallel with the lower surface 12 in accordance with the inclination angle of the long side is incident to the short sides 21 and 23, reflected thereon, converged well based on the above-mentioned parallelization and emitted from the lower surface 12.

As a result, not only the transmitted light incident to the short sides directly but also the transmitted light incident to the short sides after the light incident to the long sides is reflected thereon can be supplied to the lower surface through the reflection on the short sides. Accordingly, it is possible to improve the light availability so much. In addition, it is possible to fix the incident angle of the light reflected on the long sides and then incident to the short sides, and it is possible to prevent the reflection angle from scattering, so that parallelization and convergence of the out-going light can be attained.

Therefore, directivity can be given to the out-going light by adjusting the inclination angles of the short sides and the long sides. Accordingly, it is possible to emit light in a direction vertical to the lower surface or at an angle close to the vertical direction.

When the inclination angle $\theta_2$ of the long sides is 0 degree, the effect to parallelize the transmitted light becomes poor. When the inclination angle $\theta_2$ exceeds 10 degrees, the incident ratio of light to the long sides is reduced and it becomes insufficient to supply light to the opposite end side, so that light emission is apt to be not uniform. In addition, as for the sectional shape of the light guide plate, it is difficult to reduce the thickness on the opposite end side, and the amount of light incident to the prismatic irregularities is reduced so that the light emission efficiency is apt to lower. In view of the above-mentioned performance such as convergence of out-going light based on the parallelization of transmitted light, restraint to leakage light, and so on, the inclination angle $\theta_2$ of the long sides is set to be not larger than 8 degrees, preferably not larger than 5 degrees.

In view of visibility of a display image through the long sides of the above-mentioned light guide plate, the long sides are designed so that the difference in inclination angle $\theta_2$ between the long sides is set to be not larger than 5 degrees, preferably not larger than 4 degrees, more preferably not larger than 3 degrees. On the other hand, the difference in inclination angle $\theta_2$ between the long sides adjacent to each other is set to be not larger than 1 degree, preferably not larger than 0.3 degree, more preferably not larger than 0.1 degree.

Thus, it is possible to restrain the influence on the display image due to the difference in inclination angle $\theta_2$ between the long sides transmitting the display image. When the deflection of a transmission angle at the long sides largely varies in accordance with places, the display image becomes unnatural. Particularly, when there is a large difference of deflection of a transmitted image between picture elements close to each other, the display image is apt to be extremely unnatural.

It is assumed that the difference in inclination angle $\theta_2$ between the long sides is within the above-mentioned range of from over 0 to 10 degrees. That is, it is assumed that the inclination angle $\theta_2$ is set to be a small value so that the deflection of a display image caused by refraction when light is transmitted through the long sides are suppressed so as to be within an allowable value. It is an object of this not to change the visibility direction of the liquid-crystal display unit optimized by setting an observation point near the vertical direction.

If a display image is deflected, the optimum visibility direction is shifted from the vicinity of the vertical direction. In addition, if the deflection of the display image is large, the optimum visibility direction approaches the direction in which leakage light is emitted from the upper surface of the light guide plate, so that the display image is apt to receive influence to lower its contrast. The condition that the inclination angle $\theta_2$ of the long sides is set to be in a range of from over 0 to 10 degrees also includes such a condition that the influence of scattering of transmitted light or the like can be ignored.

To prevent a display image from being disturbed as mentioned above, it is required that light transmitted from the upper surface to the lower surface and from the lower surface to the upper surface is prevented from being scattered as much as possible. A front light provided in a reflection type liquid-crystal display unit is an auxiliary light source for enabling visual recognition in a dark place. Since visual recognition is ordinarily performed by using external light such as room light or natural light for the purpose of reducing power consumption, when incidence of external light is blocked by the light guide plate in the original state where the front light is turned off, the display becomes dark. In addition, if light is scattered by the light guide plate, the surface is made white, so that the contrast is lowered or disorder due to the mixture of display images or the like is produced.

In order to obtain a bright display image, it is preferable that the light guide plate is superior in the efficiency of incidence of external light, and superior in the efficiency of light transmission or light emission of the display image in the liquid-crystal display element. Thus, it is preferable that the light emitting means is constituted by prismatic irregularities where the projected area of the long side with respect to the reference plane of the lower surface is five or more times as large as that of the short side, preferably 10 or more times, more preferably 15 or more times. As a result, most of the display image emitted from the liquid-crystal display element can be transmitted through the long sides.

When the display image emitted from the liquid-crystal display element is transmitted, the display image incident to the short sides is reflected toward the incident side surface so as not to be emitted from the upper surface, or it is deflected and emitted in a direction very different from and opposite to that of the display image transmitted through the long sides on the basis of the normal to the lower surface. Accordingly, the display image incident to the short sides gives little influence on the display image transmitted through the long sides. Therefore, it is preferable from such a point of view that the short sides are not localized for any picture elements of the liquid-crystal display element. To put it strongly, if the short sides overlap for the whole of the picture elements, visibility of the display image near the vertical direction through the long sides can be hardly obtained.

Therefore, in order to prevent the display from becoming unnatural due to a deficiency of transmitted display light, it is preferable that the area where the short sides overlap the picture elements is reduced so that a sufficient light transmittivity through the long sides is ensured. If the picture element pitch of the liquid-crystal display element is set to be in a range of from 100 to 300 $\mu$m, it is preferable from the above-mentioned point of view that the short sides are formed to be in a range of not larger than 40 $\mu$m, preferably in a range of from 1 to 20 /Elm, more preferably in a range of from 5 to 15 $\mu$m on the basis of the projected width to the reference plane of the lower surface.

In addition, it is preferable from the above-mentioned point that the distance between the short sides is large. On the other hand, since the short sides are essential portions having a function for emitting the side surface incident light as mentioned above, if the distance between the short sides is too large, illumination is poor at the time of turn-on, so that unnatural display may occur. Taking the above-mentioned phenomena into consideration, it is preferable that the repeated pitch P of the prismatic irregularities $2a$ and $2b$ is set to be in a range of from 50 $\mu$m to 1.5 mm as shown in FIG. 6. Then, the pitch may be fixed, or may be irregular, for example, with random pitch, or random or regular combination of a predetermined number of pitch units, or the like.

In the case of a light emitting means constituted by prismatic irregularities, moire may occur due to interference with picture elements of liquid-crystal cells. Since the pitch of the picture elements of the liquid-crystal display unit is usually in a range of from about 50 to about 500 $\mu$m, it is required that the influence of the light guide plate upon transmitted light is restrained as much as possible so that information with a pitch of about 50 $\mu$m can be recognized visually and clearly. In that case, superior display quality with which the moire caused by interference with the picture elements is restrained is also required.

While moire may be prevented by adjusting the pitch of the prismatic irregularities forming the light emitting means, there is a preferred range in the pitch of the prismatic irregularities as mentioned above. Therefore, means for solving the case where moire appears within the preferred pitch range are considered.

In the present invention, it is preferable to provide such a system that prismatic irregularities are inclined with respect to the reference plane of the incident side surface so as to be arranged across the picture elements, so that moire is prevented from occurring. In that case, if the inclination angle is too large, light reflected through the short sides is deflected, so that a large deviation occurs in the direction of out-going light. As a result, the anisotropy of light emission intensity in the light transmission direction of the light guide plate becomes so large that the light availability is also reduced. The above-mentioned facts are apt to cause lowering of display quality.

From such a point of view, it is preferable that the inclination angle in the direction of arrangement of the prismatic irregularities with respect to the reference plane of the incident side surface, that is, in the ridge direction of the prismatic irregularities is set to be within ±30 degrees, preferably within ±25 degrees, more preferably within ±20 degrees. The symbol ± means the direction of the inclination based on the incident side surface. If moire is ignorable, it is preferable to make the direction of arrangement of the prismatic irregularities parallel with the incident side surface as much as possible.

Figure 5B:
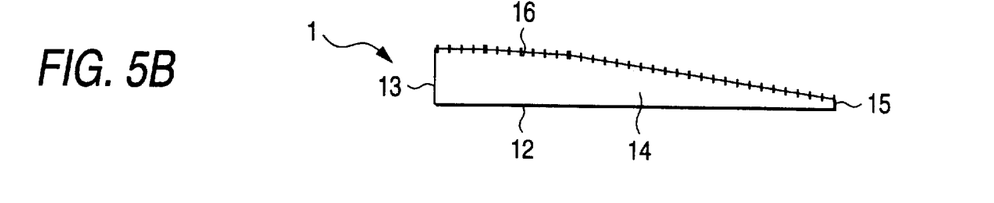
Figure 5C:
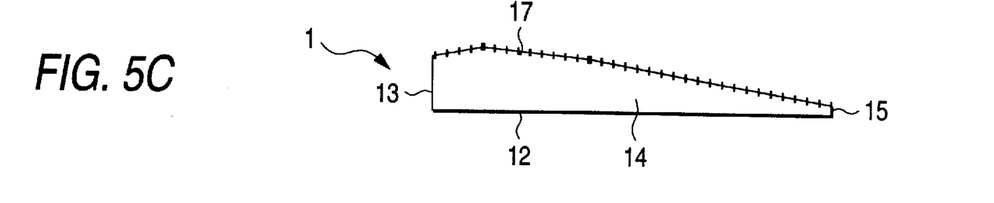

The light guide plate may be formed into a desirable shape as mentioned above. Even when the light guide plate is formed into a wedge-shape, the planer shape can be definitely and desirably formed, for example, into such a straight plane 11 as shown in FIG. 5A, or such a curved plane 16 or 17 as shown in FIG. 5B or 5C.

In addition, the prismatic irregularities forming the light emitting means are not always required to be constituted by straight planes 21, 22, 23 and 24 shown in FIG. 6, but they may be constituted by desired planar shapes including bent planes, curved planes, etc. The prismatic irregularities may be formed by the combination of irregularities having different shapes or the like as well as different pitches. Further, the prismatic irregularities may be formed as a series of protrusion portions or recess portions the ridges of which continue, or as protrusion portions or recess portions which are arranged discontinuously and intermittently in the ridge direction at a predetermined interval.

The shapes of the lower surface and the incident side surface of the light guide plate are not limited specifically, but may be determined desirably. Generally, the lower surface is constituted by a flat plane, and the incident side surface is made perpendicular to the lower surface. However, the incident side surface may be, for example, formed into a bent recess shape, or the like, corresponding to the outer circumference of a light source in order to improve the incident light efficiency. Further, the incident side surface may be configured to have an introduction portion interposed between the incident side surface and the light source. The introduction portion may be formed to have a desirable shape corresponding to the shape of the light source, etc.

A hard coat layer may be provided on the upper surface of the light guide plate in accordance with necessity in order to prevent the light emitting means from being scratched, worn by wiping, or the like, so that the above-mentioned light emission characteristics are maintained for a long term. The hard coat layer may be formed as a transparent hard film made by a suitable background-art formation method such as a vacuum-deposited film made from a glass material, particularly a hard glass material, such as silicon dioxide, zirconia, etc., a coating film made from hard polymer such as silicon polymer, fluoropolymer, etc.

Incidentally, depending on the viewing angle in the case where the light guide plate is viewed from its upper surface, the light emitting means interferes with a pattern of the light emitting means reflected on the lower surface of the light guide plate or on the reflection surface of the liquid-crystal cell so as to cause a moire phenomenon forming interference fringes. Such moire phenomenon causes a deterioration of the display quality. So the lower surface of the light guide plate may be provided with a fine rough structure in accordance with necessity in order to prevent the display quality from deteriorating due to the moire phenomenon. The fine roughness may be formed by a suitable background-art method applied to a conventional diffusion layer, such as a method of making the lower surface of the light guide plate rough, or a method of providing the lower surface of the light guide plate with a resin layer or a diffusion sheet containing transparent fine particles.

Further, the lower surface of the light guide plate may be provided with a reflection prevention layer in accordance with necessity in order to restrain reflection on the lower surface so as to prevent lowering of the contrast of a display image due to leakage light to the upper surface caused by the reflection light from the lower surface. The reflection prevention layer may be formed by a suitable method in accordance with the background art, such as a method in which an optical multi-layer film or a low refractivity layer is made from, for example, transparent dielectric material, fluorine-containing polymer, low density material, etc.; such an optical multi-layer film or low refractivity layer is attached to any sheet, or the like.

In such a view, in order to prevent lowering of the visibility characteristics due to disorder of a display image caused by scattering of light and to attain a clear display image, it is preferable that the light guide plate is designed so that the whole light transmittivity of light incident vertically, particularly in the direction from the lower surface to the upper surface, is not smaller than 90%, preferably not smaller than 92%, more preferably not larger than 95%, and Hayes is not larger than 45%, preferably not larger than 30%, more preferably not larger than 20%.

The light guide plate may be formed from desirable material exhibiting transparency corresponding to a wavelength band of a light source. In the visible light band, examples of the materials include transparent resin represented by acrylic resin, polycarbonateresin, epoxyresin, etc., and glass. A light guide plate formed from material exhibiting no or low birefringence is preferably used.

The light guide plate may be formed by any suitable method such as a cutting method. Examples of light guide plate manufacturing methods preferred in view of mass productivity include a method in which thermoplastic resin is pressed onto a mold which can give a predetermined shape to the resin under heating; a method in which a mold is filled with thermoplastic resin which is heated and melted or filled with resin which is fluidized through heat or a solvent so that a predetermined shape is given to the resin by the mold; a method in which liquid resin which can be polymerized by heat, ultraviolet rays, radiation, or the like, is filled or cast into a mold so that the resin is polymerized and given a predetermined shape from the mold; and so on.

The light guide plate in the present invention may be formed as a laminate of parts consisting of the same kind of material or different kinds of materials, for example, a laminate in which a sheet provided with a light emitting means of prismatic irregularities or the like is bonded with a light guide portion having a function of light transmission. The light guide plate is not required to be formed as an integrated single-layer body formed from one kind of material. The thickness of the light guide plate can be determined desirably in accordance with the size of the liquid-crystal display element to which the light guide plate is applied, the volume of the light source, and so on. Generally, the thickness is not larger than 20 mm, preferably in a range of from 0.1 to 10 mm, more preferably in a range of from 0.5 to 8 mm based on the incident side surface.

In the reflection type liquid-crystal display unit according to the present invention, a liquid-crystal display element having a reflecting layer is disposed tightly on the lower surface of the light guide plate through a bonding layer having a refractivity in a range of from 1.40 to 1.55 and a whole light transmittivity in a range of not smaller than 90%. By using such a light guide plate, it is possible to form a reflection type liquid-crystal display unit which is bright and easy to view, and which is superior in low power consumption. In that case, the light guide plate can be used also as a side light type planar light source unit 3 in which a light source 31 is disposed on its incident side surface 13, as shown in FIG. 8 by way of example.

In the light guide plate according to the present invention, it is possible to form a planar light source unit in which the incident light from the upper surface and the lower surface is well transmitted through the lower surface or the upper surface and in which the light parallelized precisely is emitted in the direction superior in verticality and advantageous for visibility, and in which the light from the light source is used efficiently to provide superior brightness. Accordingly, it is possible to obtain a reflection type liquid-crystal display unit having such a superior performance.

As a light source disposed on the incident side surface of the light guide plate in the planar light source unit, a desirable light source may be used. Generally, a linear light source such as a (cold or hot) cathode tube, a point light source such as a light-emitting diode, an array body in which point light sources are arranged in line, in plane or the like, a light source using a device for converting a point light source into linear light-emission points at fixed or unfixed intervals, and so on can be used preferably. In view of low power consumption, durability, etc., the cold cathode tube is particularly preferable.

Figure 8:
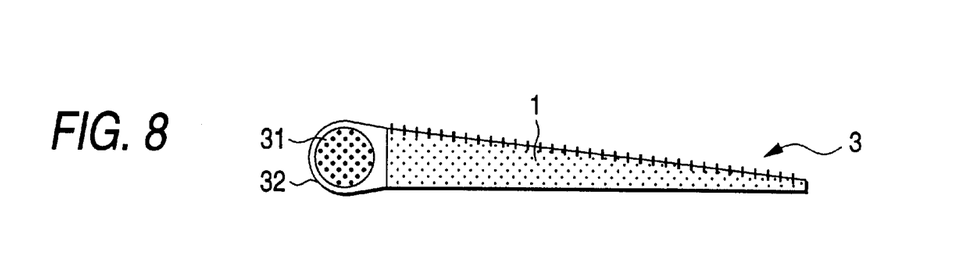
FIG. 8 shows a sectional side view of a planar light source unit.

The planar light source unit is formed as a combined body in which suitable auxiliary means are disposed in accordance with necessity, such as a light source holder 32 enclosing a light source in order to introduce light emitted from a light source 31 to the incident side surface of the light guide plate as shown in FIG. 8; a diffusion layer 4 disposed on the lower surface of the light guide plate in order to obtain a uniform planar light emission; and so on.

A resin sheet provided with a high reflectivity metal thin film, metal foil, etc. are generally used for the light source holder. When the light source holder is bonded with an end portion of the light guide plate through bonding agent or the like, it is possible to omit the formation of the light emitting means in the bonding portion.

The diffusion layer is disposed on a light emission surface of the planar light source unit, that is, on the lower surface 12 of the light guide plate 1 in advance in accordance with necessity in order to prevent shading so as to make brightness uniform, or to reduce moire due to mixture of adjacent light rays. In the present invention, in view of maintenance of directivity of light emitted from the light guide plate, or availability of light, a diffusion layer with a narrow diffusion range can be used preferably.

Based on the above-mentioned fine roughness of the lower surface, the diffusion layer can be formed by a suitable method, such as a method in which transparent particles having high refractivity are dispersed into transparent resin having low refractivity so as to be coated and hardened on the lower surface; a method in which transparent resin having bubbles dispersed is coated and hardened; a method in which the base surface is swelled through a solvent so as to produce crazes; a method for forming a transparent resin layer having an irregular rough surface; a method using a diffusion sheet formed based on the above-mentioned methods; and so on. The method of forming the diffusion layer is not limited specifically. The irregular rough surface may be formed by a suitable method such as a mechanical and/or chemical processing method in which a rough shape of a roll, a mold, or the like, the surface of which is roughed is transferred onto the surface of the base material or a transparent resin coating layer provided thereon.

In the reflection type liquid-crystal display unit shown in FIGS. 1 and 2, the light guide plate 1 is used in a front light system as a planar light source 3. The reference numeral 5/51 represents a polarizing plate; 61/63, a cell substrate; 62, a liquid-crystal layer; and 7/64, a reflecting layer. The reflection type liquid-crystal display unit can be formed by tightly disposing a liquid-crystal display element 6 having the reflecting layers 7 and 64, through a bonding layer 2, on the light emission side of the planar light source unit, that is, on the lower surface of the light guide plate 1 in the planar light source unit as shown in the drawing.

The reflection type liquid-crystal display unit can be generally formed by suitably assembling constituent parts such as liquid crystal display element constituted by a liquid-crystal cell having a transparent electrode functioning as a liquid-crystal shutter and a drive accompanying the liquid-crystal cell; a polarizing plate; a front light; a reflecting layer; a compensating phase difference plate if necessary; and so on.

In the present invention, the reflection type liquid-crystal display unit can be formed based on a background-art case as illustrated in the drawings, without any special limit except the point that the above-mentioned light guide plate or the planar light source unit is used, and a liquid-crystal display element having a reflecting layer is tightly disposed through a bonding layer having a refractivity in a range of from 1.40 to 1.55 and a whole light transmittivity in a range of not smaller than 90%, on the lower surface of the light guide plate. In the example of FIG. 1, a transparent electrode is not shown.

Therefore, there is no special limit about the liquid-crystal display element used here. For example, based on the orientation mode of liquid crystal, it is possible to use a suitable liquid-crystal display element, for example, a twist system or non-twist system such as TN type or STN type, vertical orientation cell type or HAN cell type, or OCB cell type; a guest host system; or ferroelectric liquid-crystal system. In addition, there is no special limit about the driving system for liquid crystal, it is possible to use any suitable driving system such as an active matrix system, a passive matrix system, or the like.

Although it is essential, in the reflection type liquid-crystal display unit, to provide the reflecting layer 7/64, it may be disposed outside the liquid-crystal display element 6 as shown in FIG. 1, or disposed inside the liquid-crystal display element 6 as shown in FIG. 2. The reflecting layer may be formed as a suitable reflecting layer based on the background art, such as a coating layer made from powder of high reflectivity metal such as aluminum, silver, gold, copper, chrome or the like in binder resin; an additional layer of metal thin film formed by vacuum deposition; a reflecting sheet in which such a coating layer or such an additional layer is supported on a base; metal foil; and so on.

When the reflecting layer 64 is provided inside the liquid-crystal display element 6 as shown in FIG. 2, it is preferable that the reflecting layer is formed by a method of forming an electrode pattern of high conductive material such as the above-mentioned high refractive metal or the like; a method of forming a transparent conductive film, for example, of a transparent electrode formation material on a transparent electrode pattern; or the like.

As the polarizing plate, a desirable one may be used. But, it is preferable to use a polarizing plate having a high degree of polarization such as an absorption type linear polarizer, for example, of an iodine system or a dyestuff system, rather than incidence of high-degree linear polarization with a superior contrast ratio.

When the reflection type liquid-crystal display unit is formed, it is possible to desirably dispose suitable optical elements, such as a diffusion plate, an antiglare layer, a reflection preventing film or a protective layer provided on the polarizing plate on the viewing side, or a compensating phase difference plate provided between the liquid-crystal display element and the polarizing plate.

It is a purpose of the above-mentioned compensating phase difference plate to compensate wavelength dependence of birefringence or the like so as to improve visibility. In the present invention, the compensating phase difference plate is disposed, for example, between the polarizing plate on the viewing side and/or on the back side and the liquid-crystal display element in accordance with necessity. As for the compensating phase difference plate, a desirable one may be used in accordance with a wavelength band. The compensating phase difference plate may be formed as a superimposed layer of one phase difference layer or two or more phase difference layers.

It is a purpose of the above-mentioned compensating phase difference plate to compensate wavelength dependence of birefringence or the like so as to improve visibility. In the present invention, the compensating phase difference plate is disposed, for example, between the polarizing plate on the viewing side and/or on the back side and the liquid-crystal display element in accordance with necessity. As for the compensating phase difference plate, a desirable one may be used in accordance with a wavelength band. The compensating phase difference plate may be formed as a superimposed layer of one phase difference layer or two or more phase difference layers.

It is a purpose of the tight arrangement of the liquid-crystal display element on the lower surface of the light guide plate through a bonding layer to restrain reflection loss in the interfaces. In such a point, a bonding layer having a refractivity in a range of from 1.40 to 1.55 and a whole light transmittivity in a range of not smaller than 90% is used as the bonding layer. It is preferable to use a bonding layer which is superior in the whole light transmittivity, particularly preferable that the whole light transmittivity is not smaller than 95%.

The thickness of the bonding layer may be determined desirably. But it is generally set to be in a range of from 5 to 800 μm, preferably from 10 to 600 μm, more preferably from 15 to 500 μm in view of the above-mentioned whole light transmittivity, the bonding force and so on. The refractivity may be determined desirably within the above-mentioned range of from 1.40 to 1.55 in accordance with the refractivity of the object to be bonded. In view of restraint of reflection loss and so on, it is preferable that the bonding layer has a refractivity between the refractivities of adjacent layers on both sides of the bonding layer.

The bonding layer may be formed from suitable adhesive matter satisfying the above-mentioned refractivity and whole light transmittivity. Tackiness agent of tacky matter or gel sheet may be used preferably in view of easiness in the working of bonding. As for the tacky matter, it is possible to use a desirable known tackiness agent of any material such as rubber polymer, acrylic polymer, vinylalkyl ether polymer, silicon polymer, or the like. Particularly, it is preferable to use a tackiness agent containing acrylic polymer using acrylic or methacrylic alkyl ester as an ingredient, in view of transparency, heat resistance, and so on.

Examples of such acrylic polymers include one kind or two or more kinds of acrylic alkyl esters consisting of acrylic or methacrylic ester containing straight-chain or branching alkyl-group the carbon number of which is from 1 to 20, such as methyl group, ethyl group, propyl group, butyl group, isobutyl group, amyl group, isoamyl group, hexyl group, heptyl group, cyclohexyl group, 2-ethylhexyl group, octyl group, isooctyl group, nonyl group, isononyl group, decyl group, undecyl group, lauryl group, tridecyl group, tetradecyl group, stearyl group, or octadecyl group.

In order to improve adhesion by introducing functional group or polar group, to improve cohesion or heat resistance by controlling the glass transition temperature of generated copolymer, or to improve tackiness characteristic, for example, increase of molecular weight by giving crosslinking reactivity as occasion demands, the above-mentioned acrylic polymer other than the above-mentioned acrylic alkyl ester may be one kind or two or more kinds of copolymerized monomers suitable for the aimed improvement.

Examples of the quality improving monomers include carboxyl group containing monomers such as acrylic alkyl esters other than the above-mentioned ones, acrylic acid, metacrylic acid, carboxyl ethyl acrylate, carboxyl pentyl acrylate, itaconic acid, maleic acid, fumaric acid, crotonic acid; acid anhydrous monomers such as maleic anhydride, itaconic anhydride; hydroxyl group containing monomers such as 2-hydroxyl ethyl (meta) acrylate, 2-hydroxyl propyl (meta)acrylate, 4-hydroxyl buthyl (meta)acrylate, 6-hydroxyl hexyl (meta)acrylate, 8-hydroxyl octyl (meta) acrylate, 10-hydroxyl decyl (meta)acrylate, 12-hydroxyl lauryl (meta)acrylate, (4-hydroxyl methyl cyclohexyl)-methyl acrylate; sulfonic acid containing monomers such as styrene sulfonic acid, allyl sulfonic acid, 2-(meta) acrylamide-2-methylpropane sulfonic acid, (meta) acrylamide propane sulfonic acid, sulfopropyl (meta) acrylate, (meta)acryloil oxynaphthalene sulfonic acid; and phosphoric group containing monomers such as 2-hydroxyl ethyl acryloil phosphate.

Other examples of the quality improving monomers include (N-substituted) amide monomers such as (meta) acrylamide, N,N-dimethyl (meta)acrylamide, N-butyl (meta)acrylamide, N-methylol (meta)acrylamide, N-methylolpropane (meta)acrylamide; (meta)acrylic alkylamino alkyl monomers such as amino ethyl (meta)acrylate, N,N-dimethyl amino ethyl (meta)acrylate, t-butyl amino ethyl (meta)acrylate; (meta)acrylic alkoxyalkyl monomers such as methoxyethyl (meta)acrylate, ethoxyethyl (meta) acrylate; maleimide monomers such as N-cyclohexyl maleimide, N-isopropyl maleimide, N-lauryl maleimide, N-phenyl maleimide; itaconimide monomers such as N-methyl itaconimide, N-ethyl itaconimide, N-butyl itaconimide, N-octyl itaconimide, N-2-ethyl hexyl itaconimide, N-cyclohexyl itaconimide, N-lauryl itaconimide; and succinimide monomers such as N-(meta)acryloil oxymethylene succinimide, N-(meta)acryloil-6-oxyhexamethylene succinimide, N-(meta)acryloil-8-oxyoctamethylene succinimide.

Further, other examples of the quality improving monomers include vinyl monomers such as vinyl acetate, vinyl propionate, N-vinyl pyrolidone, methyl vinyl pyrolidone, vinyl pyridine, vinyl piperidon, vinyl pyrimidine, vinyl piperazine, vinyl pyrazine, vinyl pyrrole, vinyl imidazole, vinyl oxazole, vinyl morpholine, N-vinyl carboxyl amides, styrene, α-methyl styrene, N-vinyl caprolactam; cyanoacrylate monomers such as acrylonitrile, metacrylonitrile; epoxy group containing acrylic monomers such as glycidyl (meta) acrylate; glycol acrylate monomers such as polyethylene glycol (meta)acrylate, polypropylene grycol (meta)acrylate, methoxyethylene glycol (meta)acrylate, methoxypolypropylene glycol (meta)acrylate; acrylate monomers such as tetrahydrofurfuryl (meta)acrylate, fluoro (meta)acrylate, silicon (meta)acrylate, 2-methoxyethyl acrylate; and so on.

On the other hand, polyfunctional acrylate monomers may be used as the quality improving monomers in accordance with necessity. The polyfunctional acrylate monomers enable crosslinking without additive crosslinker through a post-crosslinking operation by radiation of rays such as electron rays. Examples of polyfunctional acrylate monomers include hexane diol di(meta)acrylate, (poly)ethylene glycol di(meta)acrylate, (poly)propylene glycol di(meta)acrylate, neopentyl glycol di(meta)acrylate, pentaerythritol di(meta)acrylate, trimethylolpropane tri(meta)acrylate, pentaerythritol tri(meta)acrylate, dipentaerythritol hexa(meta)acrylate, epoxyacrylate, polyester acrylate, urethane acrylate, etc.

For example, acrylic polymer may be prepared by applying a suitable method such as a solution polymerization method, an emulsion polymerization method, a self-polymerization method by means of rays, a suspension polymerization method, or the like, to one kind of, or a mixture of two or more kinds of, monomers. The bonding layer may be formed as a crosslinking layer formed by a suitable method such as an internal crosslinking method, an external crosslinking method, etc.

The bonding layer may be formed of an adhesive sheet obtained by a desirable method such as a method in which an adhesive composition using the above-mentioned polymer or the like is made a solution using a solvent or the like in accordance with necessity, and developed on a separator in a suitable method, and another separator is disposed on the developed layer so as to be formed into a sheet.

Figure 3:
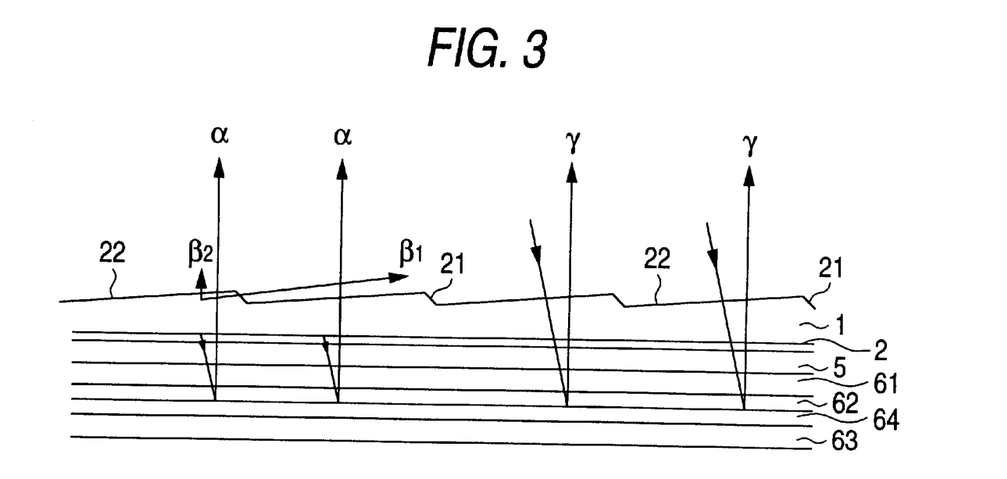
FIG. 3 shows an explanatory view of a display image according to an embodiment.
Figure 4:
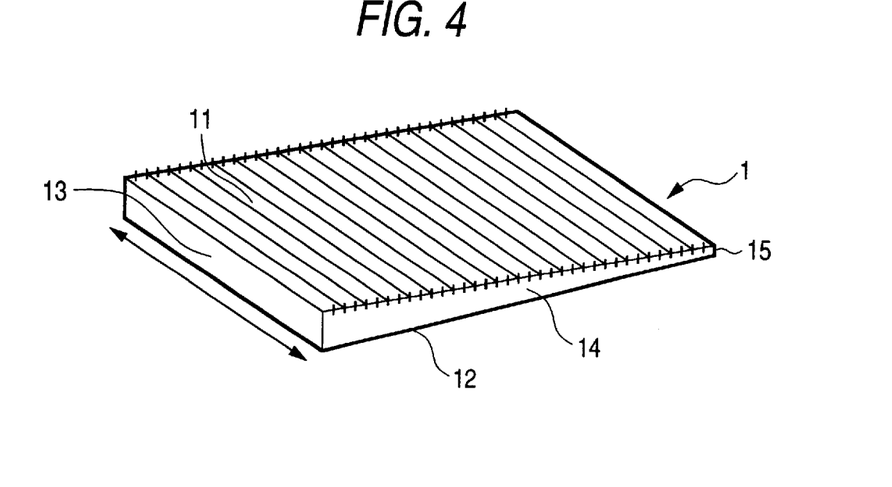
FIG. 4 shows a perspective view explaining a light guide plate.

In the reflection type liquid-crystal display unit according to the present invention, chiefly transmitted light through the long sides of the light guide plate is observed. FIG. 3 shows a state of visual recognition in the case where the reflecting layer 64 is provided inside the liquid-crystal display element. According to this case, when the planar light source unit is on, light α emitted from the lower surface of the light guide plate 1 passes through the bonding layer 2, the polarizing plate 5, the liquid-crystal layer 62 and so on, and then reflected on the reflecting layer 64. Then, the reflected light reaches the light guide plate 1 through the liquid-crystal layer, the polarizing plate, the bonding layer and so on in the reverse direction. As a result, a display image (α) transmitted through the long side 22 is visually recognized.

In the above-mentioned case, according to the present invention, intense leakage light $\beta_1$ goes out in the direction shifted by a large angle from the front direction perpendicular to the liquid-crystal display element, while faint leakage light $\beta_2$ goes out in the front direction. It is therefore possible to visually recognize a display image superior in display quality near the front direction through the long side.

On the other hand, also when the planar light source unit uses external light in turned-off state, light γ incident from the long side 22 of the upper surface of the light guide plate 1 is transmitted through the bonding layer, the polarizing plate, the liquid-crystal layer, the reflecting layer and so on as mentioned above, and then reaches the light guide plate 1 through the above-mentioned layers reversely. As a result, a display image (γ) transmitted through the long side can be visually recognized near the front direction in the state superior in display quality so that the display image is little disturbed by the light guide plate.

In the present invention, it is preferable that the above-mentioned optical elements or parts forming the reflection type liquid-crystal display unit, other than the light guide plate and the liquid-crystal display element, for example, the diffusion layer, the polarizing layer and so on are laminated tightly and integrally with one another, in view of restraint of reflection on the interfaces to prevent lowering of the contrast. A desirable one such as the above-mentioned bonding layer or the like can be used for bonding the optical elements or the parts. A bonding layer may contain the above-mentioned transparent particles or the like so as to exhibit a diffusion function.

EXAMPLE 1

The upper surface of a transparent plate of polymethyl methacrylate was cut with a diamond bit so as to produce a light guide plate which had a width of 80 mm, a depth of 130 mm, a thickness of 2 mm at the incident side surface, and a thickness of 0.8 mm at the opposite end. The lower surface (light emission surface) of the light guide plate was flat, while the upper surface was an upward projecting curved surface (FIG. 5B) which substantially formed a plane extending from the incident side surface toward the opposite end. The upper surface was provided with prismatic irregularities which were parallel with the incident side surface and arranged at a pitch of 390 μm. The inclination angle of the short side varied within a range of from 36.5 to 39 degrees, while the inclination angle of the long side varied within a range of from 1.1 to 1.5 degrees. An inclination angle difference between adjacent long sides was within a range of 0.1 degree. The projection width of the short side to the lower surface was in a range of from 10 to 21 μm, and the projection area ratio of the long side to the short side was not smaller than 17/1. The formation of the prismatic irregularities was started at a place 2 mm away from the incident side surface.

Next, a cold cathode tube having a diameter of 2.4 mm was disposed on the incident side surface of the light guide plate, and enclosed by a light source holder of polyester film subjected to vacuum evaporation with silver so that the edges of the light source holder were in tight contact with the upper and lower end surfaces of the light guide plate. An inverter and a DC power supply were connected to the cold cathode tube to thereby obtain a planar light source unit. A black-and-white reflection type TN liquid-crystal display element having, at its back surface, a reflecting sheet corresponding to the light source holder was tightly disposed on the light emission side (lower surface of the light guide plate) of the planar light source unit through an acrylic adhesive sheet having a thickness of 300 μm, a refractivity of 1.47 and a whole light transmittivity of 91%.

A reflection type liquid-crystal display unit based on Example 1 was obtained except that a TN liquid-crystal display element was disposed directly on the surface on the light emission side of the planar light source unit without interposition of an acrylic adhesive sheet.

Evaluation Test

The following characteristics were tested upon the planar light source units and the reflection type liquid-crystal display units obtained in Example and Comparative Example.

Light Emission Intensity

The angle characteristic of the light emission intensity in the upper and lower surfaces of the central portion of the light guide plate was measured by a luminance meter (by Thompson Co. Ltd., BM7) in the state where the planar light source unit was turned on. The measurement was performed under the condition that the angle was changed on the basis of the direction of a normal to the lower surface in a plane perpendicular to the lower surface and the incident side surface. Obtained measured values were multiplied by the cosines of the corresponding measuring angles θ in order to fix the measured areas, so that light emission intensity at the angle θ was obtained and the light emission direction exhibiting the maximum intensity was obtained together. The following table shows the maximum intensity and direction on the lower surface side, and the light emission intensity on the upper surface side in the direction of a mirror symmetric direction with respect to the maximum direction on the lower surface side based on the normal and the lower surface.

Solid 30-degree Light Amount

A cylindrical jig having a hole of a diameter of 10 mm and having an inner surface matte-black coated was disposed on the side opposite to an illuminance meter so that the solid angle formed by the hole and the light reception surface of the illuminance meter was 30 degrees. The amount of light emitted from the upper and lower surfaces of the planar light source unit which was turned on within a solid angle of 30 degrees was measured by using the jig and the illuminance meter. The result is shown in the following table.

Front Luminance and Visibility

In the state where the reflection type liquid-crystal display unit was driven, the front luminance and visibility in a white state were measured under the condition that the planar light source unit was turned on. The result is also shown in the following table. When the front luminance in the case where a planar light source unit was not disposed was measured, for reference, in the same manner as described above, it was 28 cd/m².

|  | Example 1 | Comparative |
|---|---|---|
| maximum intensity angle on lower surface side (degree) | 16 | the same as left |
| maximum intensity on lower surface side (cd/m²) | 680 | the same as left |
| Corresponding emission intensity on upper surface side (cd/m²) | 34 | the same as left |
| Corresponding maximum emission intensity ratio of upper surface side to lower surface side | 0.050 | the same as left |
| solid 30-degree light amount on lower surface side (LX) | 14.5 | the same as left |
| solid 30-degree light amount on upper surface side (LX) | 1.3 | the same as left |
| front luminance (cd/m²) | 50 | 45 |
| Visibility | superior | production of blurring in white |

What is claimed is:

1. A reflection type liquid-crystal display unit comprising:
    a light guide plate having an upper surface, a lower surface and a light incident surface, said light guide plate being provided with a light emitting means constituted by prismatic irregularities formed on said upper surface, so that incident light from said incidence side surface is emitted from said lower surface by reflection of said light emitting means, and the light emitted from said lower surface takes maximum intensity in a direction at an angle of 30 degrees or less with respect to a normal to a reference plane defined by said lower surface, while maximum intensity of leakage light from said upper surface in said direction at an angle of 30 degrees or less is not larger than ⅕ of the maximum intensity in said lower surface, while incident light from said lower surface is transmitted from said upper surface; and
    a liquid-crystal display element provided with a reflection layer and disposed in contact on said lower surface of said light guide plate through a bonding layer, said bonding layer having a refractive index in a range of from 1.40 to 1.55 and whole light transmittivity in a range of not less than 90%.

2. A reflection type liquid-crystal display unit according to claim 1, in which said light emitting means has a structure in which continuous or discontinuous prismatic irregularities constituted by short sides and long sides are repeated at a pitch in a range of from 50 μm to 1.5 mm, each of said short sides being constituted by a slope which is inclined so as to descend from said incident side surface to an opposite end at an inclination angle in a range of from 30 to 40 degrees with respect to said reference plane defined by said lower surface and with a projection width in a range not larger than 40 μm, each of said long sides being constituted by a slope which is inclined at an inclination angle in a range of from over 0 to 10 degrees with respect to said reference plane, while a difference in inclination angle between all the slopes of said long sides is not larger than 5 degrees, and a difference in inclination angle between any adjacent two of said long sides is not larger than 1 degree, a projection area of any one of said long sides to said reference plane being 5 times or more as large as a projection area of any one of said short sides to said reference plane.

3. A reflection type liquid-crystal display unit according to claim 2, wherein a direction of ridges of said prismatic irregularities is within an angle range of ±30 degrees with respect to a reference plane defined by said incident side surface.

4. A reflection type liquid-crystal display unit according to claim 3, wherein said light guide plate provided with a light source disposed on said incident side surface is used as a planer light source unit.

5. A reflection type liquid-crystal display unit according to claim 2, wherein said light guide plate provided with a light source disposed on said incident side surface is used as a planer light source unit.

6. A reflection type liquid-crystal display unit according to claim 1, wherein a direction of ridges of said prismatic irregularities is within an angle range of ±30 degrees with respect to a reference plane defined by said incident side surface.

7. A reflection type liquid-crystal display unit according to claim 6, wherein said light guide plate provided with a light source disposed on said incident side surface is used as a planer light source unit. respect to a reference plane defined by said incident side surface.

8. A reflection type liquid-crystal display unit according to claim 1, wherein said light guide plate provided with a light source disposed on said incident side surface is used as a planer light source unit.

* * * * *